US008083497B2

(12) United States Patent
Gilpatrick et al.

(10) Patent No.: US 8,083,497 B2
(45) Date of Patent: Dec. 27, 2011

(54) PRESSURE WASHER PUMP HOUSING STAND

(75) Inventors: Richard J. Gilpatrick, Whitewater, WI (US); Wesley C Sodemann, Dousman, WI (US); Peter A. Chiello, Waukesha, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 261 days.

(21) Appl. No.: 12/345,914

(22) Filed: Dec. 30, 2008

(65) Prior Publication Data

US 2009/0116972 A1 May 7, 2009

Related U.S. Application Data

(63) Continuation-in-part of application No. 29/233,732, filed on Jul. 8, 2005, now Pat. No. Des. 583,757.

(51) Int. Cl.
*F04B 53/00* (2006.01)
*F04B 17/05* (2006.01)
*F16M 11/00* (2006.01)

(52) U.S. Cl. ...... 417/234; 417/360; 417/364; 248/163.1

(58) Field of Classification Search .................. 417/234, 417/360, 364; 248/129, 163.1, 440, 519, 248/688; 280/47.2
See application file for complete search history.

(56) References Cited

U.S. PATENT DOCUMENTS

| | | | | | |
|---|---|---|---|---|---|
| 453,856 | A * | 6/1891 | Christy | 248/129 |
| 517,211 | A * | 3/1894 | Clarke | 248/163.1 |
| 1,528,449 | A * | 3/1925 | Meyer | 417/364 |
| 2,066,030 | A * | 12/1936 | Clark | 222/179 |
| 3,115,096 | A * | 12/1963 | Wall | 417/360 |
| 3,149,651 | A * | 9/1964 | Belrose | 83/471 |
| 5,147,182 | A * | 9/1992 | Timmons | 417/234 |
| 5,494,414 | A * | 2/1996 | Steinhart et al. | 417/360 |
| 5,653,584 | A * | 8/1997 | Mazzucato et al. | 417/360 |
| 5,700,137 | A * | 12/1997 | Simonette | 417/364 |
| 7,219,873 | B2 * | 5/2007 | Harwood | 248/519 |
| 7,562,780 | B2 * | 7/2009 | Gilpatrick et al. | 211/70.6 |
| 7,604,246 | B2 * | 10/2009 | Sodemann et al. | 280/47.315 |

* cited by examiner

*Primary Examiner* — Devon C Kramer
*Assistant Examiner* — Nathan Zollinger
(74) *Attorney, Agent, or Firm* — Rathe Lindenbaum LLP

(57) ABSTRACT

An apparatus and method to support a pressure washer pump housing with a stand directly connected to the pressure washer pump housing. The stand comprises a horizontal platform connected to an underside of an engine and legs comprising vertical portions and strut portions, the vertical portions directly connected to and obliquely extending from the platform and the strut portions obliquely extending from the housing to the vertical portions.

22 Claims, 8 Drawing Sheets

PRESSURE WASHER PUMP HOUSING STAND

CROSS-REFERENCE TO RELATED PATENT APPLICATIONS

The present application is a continuation-in-part application claiming priority from co-pending U.S. application Ser. No. 29/233,732 filed on Jul. 8, 2005 by Wesley C. Sodemann, Peter Nushart, Billy Brandenburg and Christopher Ludlum, the entire disclosure of which is hereby incorporated by reference.

BACKGROUND

Pressure washers utilize an engine to drive a pump to forcibly expel liquid under pressure. Portable pressure washers include a stand. Existing arrangements of the engine, the pump and the stand are complex, costly and space consuming.

DETAILED DESCRIPTION OF THE EXAMPLE EMBODIMENTS

Figure 1:
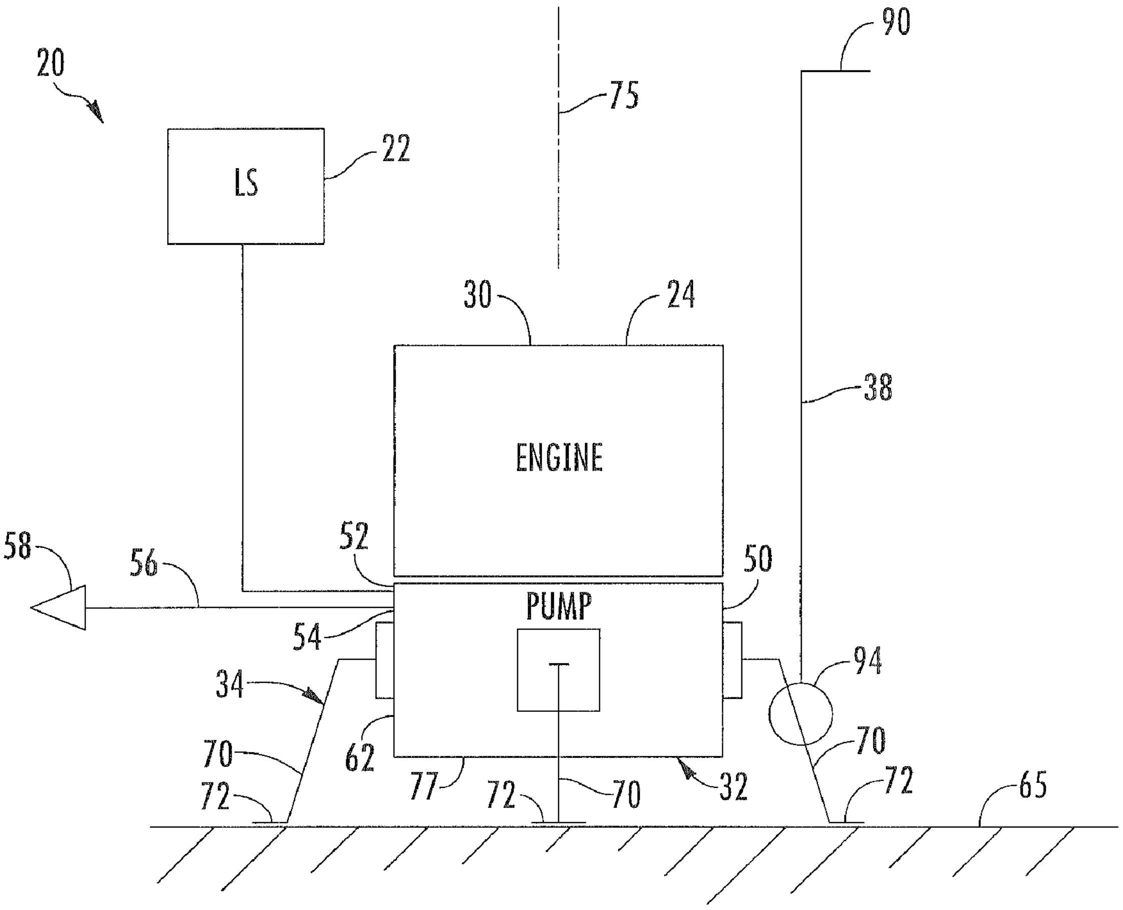
FIG. 1 is a schematic illustration of a pressure washer system including a pressure washer connected to a liquid source according to an example embodiment.

FIG. 1 schematically illustrates one example of a pressure washer system 20. Pressure washer system 20 generally includes liquid source 22 and pressure washer 24. Liquid source 22 comprises a source of relatively low pressure liquid, such as water, connected to pressure washer 24.

Pressure washer 24 pumps the low pressure liquid such after liquid may be ejected at a relatively higher pressure. Pressure washer 24 includes engine 30, pressure washer pump 32, stand 34 and handle 38. As will be described hereafter, stand 34 is directly connected to pump 32, reducing the complexity, cost and space consumption of pressure washer 24.

Engine 30 comprises a small internal combustion engine such as those commercially available from Briggs & Stratton of Wauwatosa, Wis., such as single cylinder vertical shaft engines: M9, M10, M12 and W14; V-twin vertical shaft engines, M40, M44, M49. In other embodiments, engine 30 may alternatively comprise smaller or larger engines sold or manufactured by Briggs & Stratton or others. Engine 30 is supported above pump 32. Engine 30 supplies motion or power so as to drive pump 32.

Pump 32 receives low pressure liquid from liquid source 22 and outputs the same liquid at a much greater pressure. According to one embodiment, pump 32 comprises a pump at least similar to the pump shown and described in U.S. Pat. No. 6,092,998 to Dexter et al. which issued on Jul. 25, 2000, the full disclosure of which is hereby incorporated by reference. In other embodiments, pump 32 may comprise other pumps having other configurations.

In the example illustrated, pump 32 comprises an outer housing 50, an inlet 52, an outlet 54 and a hose or other fluid connection 56 terminating at a spray wand 58. Outer housing 50 encloses internal components of pump 32. In one embodiment, housing 50 has an outer wall with an interior surface forming an internal volume or chamber containing lubricant and moving components, such as a wobble plate (not shown) or other powered reciprocating or rotating components of the pump. As will be described hereafter, the outer wall has an exterior surface or outer surface 62 to which stand 34 is directly connected.

Inlet 52 provides an opening by which low pressure liquid from liquid source 22 enters pump 32. Outlet 54 comprises an opening by which liquid pressurized by pump 32 enters fluid connection 56. Spray wand 58 comprises a manual device by which a person may direct the pressurized liquid and control its discharge.

Stand 34 supports engine 30 and pump 32. In one embodiment, stand 34 elevates engine 30 and pump 32 above a support surface 65, such as a floor or ground. Stand 34 includes legs 70 and feet 72. Legs 70 extend from housing 50 of pump 32 and terminate at feet 72. Legs 70 are directly connected to housing 50 of pump 32. Because housing 50 of pump 32 is connected directly to stand 34, pump 32 is better stabilized against vibration. Because housing 50 of pump 32 is connected directly to stand 34, housing 50 of pump 32 supplements the rigidity of stand 34. As a result, the combination of housing 50 and stand 34 forms a more rigid and sturdy structure for supporting pump 32 and engine 30. In addition, because housing 50 of pump 32 forms a part of the overall structure supporting pressure washer 24, pressure washer 24 may be formed with fewer parts, is less complex and is more compact.

In the particular example illustrated, legs 70 are directly connected to housing 50 of pump 32 at multiple spaced locations about pump 32. In one embodiment, legs 70 are equiangularly spaced about pump 32. In one embodiment, housing 50 of pump 32 extends along and is centered about a vertical axis 75, wherein legs 70 include at least three legs, and nominally four legs, angularly spaced from one another about axis 75. In one embodiment, legs 70 concentrically extend about pump housing 50. Housing 50 has a lower end 77 between locations where each of legs 70 is connected to housing 50 and feet 72. As a result, pump 32 and its housing 50 are at least partially nested within and between legs 70. Consequently, the height of pressure washer 24 is reduced, providing pressure washer 24 with a lower center of mass. The length of legs 70 may also be reduced. Thus, pressure washer 24 is more compact and more stable.

According to one embodiment, stand 34 and its legs 70 are directly joined to outer wall 62 of pump housing 50 by being integrally formed as part of a single unitary body with wall 62 of housing 50. As a result, the overall supporting structure provided by pump housing 50 and stand 34 is stronger and more rigid. In one embodiment, pump housing 50 and legs 70 are integrally formed as a single unitary body from a cast, or molded metal, such as aluminum. In other embodiments, housing 50 and stand 34 maybe form from other materials. In another embodiment, legs 70 are integrally formed as part of a single unitary body with wall 62 of housing 50 by being welded to wall 62.

According to another embodiment, stand 34 and its legs 70 are directly joined to outer wall 62 of pump housing 50 by being mounted directly to housing 50 or wall 62 of housing 50. For example, one embodiment, legs 70 may be riveted or otherwise fastened to housing 50 in a substantially permanent manner, wherein removal or separation of stand 34 from pump housing 50 would require breaking, cutting or severing of those elements securing stand 34 to pump housing 50.

In one embodiment, legs 70 are directly connected to housing 50 of pump 32 in a removable fashion. For example, in one embodiment, legs 70 are directly connected to pump housing 50 with screws, bolts or other fasteners which require the use of tools, but which allow legs 70 to be separated from pump housing 50 without permanent deformation or destruction of the fastening elements. In still other embodiments, legs 70 are directly connected to pump housing 50 with one or more releasable or removable fastening structures that allow legs 70 to be manually separated from pump housing 50 without the use of tools. For example, in one embodiment, each of legs 70 or multiples of legs 70 interconnected as a group or subgroup of the total number of legs 70 may be secured to pump housing 50 using tongue and groove arrangements, snap lock arrangements and the like. In one embodiment, housing 50 may be provided with the groove that is configured receive a tongue associated with one or more of legs 70. In other embodiments, this relationship may be reversed. In those embodiments in which legs 70 are removable or separable from housing 50 without deforming or destroying parts of the connection, legs 70 may be removed for storage or shipment. Legs 70 may also be removed for replacement or repair.

Feet 72 extend from a lower end of each of legs 70 and are configured to bear against or rest upon the supporting surface such as supporting surface 65. Feet 72 provide a stable structure for supporting pressure washer 24. According to one embodiment, feet 72 may be provided with shoes (not shown) which provide increased gripping or friction. In other embodiments, feet 72, themselves, may have surfaces configure to grip surface 65. In some embodiments, feet 72 may provide structures upon which wheel assemblies may be mounted. In yet other embodiments, feet 72 may be omitted.

Handle 38 comprises a structure coupled to the remainder of pressure washer 24 configured to facilitate repositioning and transport of pressure washer 24. Handle 38 includes a manual gripping portion 90 by which a person may manually grasp handle 38. Gripping portion 90 extends above engine 30. As a result, a person may individually move pressure washer 24 by grasping gripping portion 90 without having to bend over as much. In particular embodiments, handle 38 is configured to be actuated between different configurations or lengths such that gripping portion 90 may be set at different heights with respect to engine 24. As a result, gripping portion 90 may be set at different heights to accommodate different heights of different individuals or gripping portion 90 may be repositioned below a top of engine 30 to facilitate compact storage or shipment. In one embodiment, handle 38 is telescopic, wherein an upper portion of handle 38 telescopically extands and retracts with respect to a lower portion of handle 38. In another embodiment, handle 38 may include multiple segments configure to be pivoted or folded relative to one another. In yet other embodiments, handle 38 may have a single non-adjustable height or length.

In one embodiment, handle 38 is connected to pump 24 by being connected to legs 70 at junction 94. In one embodiment, junction 94 is a fixed or permanent junction such that handle 38 may not be separated from one or more of legs 70. In another embodiment, junction 94 is configured facilitate separation of handle 38 from legs 70 without permanent deformation or permanent physical damage of junction 94 such that handle 38 may be subsequently reattached to the one or more legs 70. In one embodiment, junction 94 may comprise a joint allowing the angle at which handle 38 extends from legs 70 and from the remainder of pressure washer 24 to be adjusted. Although junction 94 is illustrated as being provided on legs 70, in other embodiments, junction 94 may be provided on one or more of feet 72. It still other embodiments, junction 94 may be directly connected to other portions of stand 34, to engine 30 or to pump 32. In some embodiments, handle 38 may be omitted.

Figure 2:
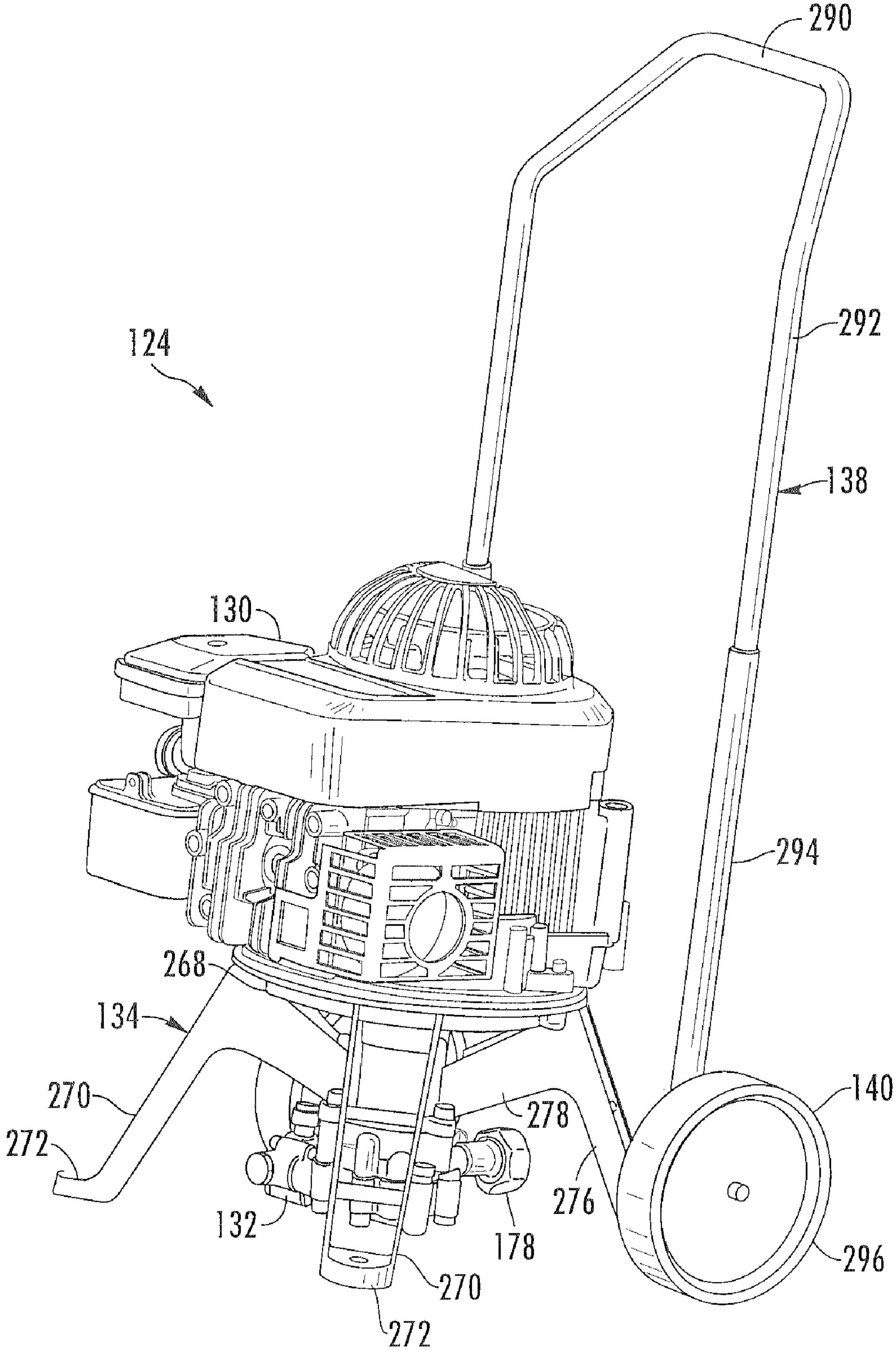
FIG. 2 is a front perspective view of another embodiment of the pressure washer of FIG. 1.
Figure 3:
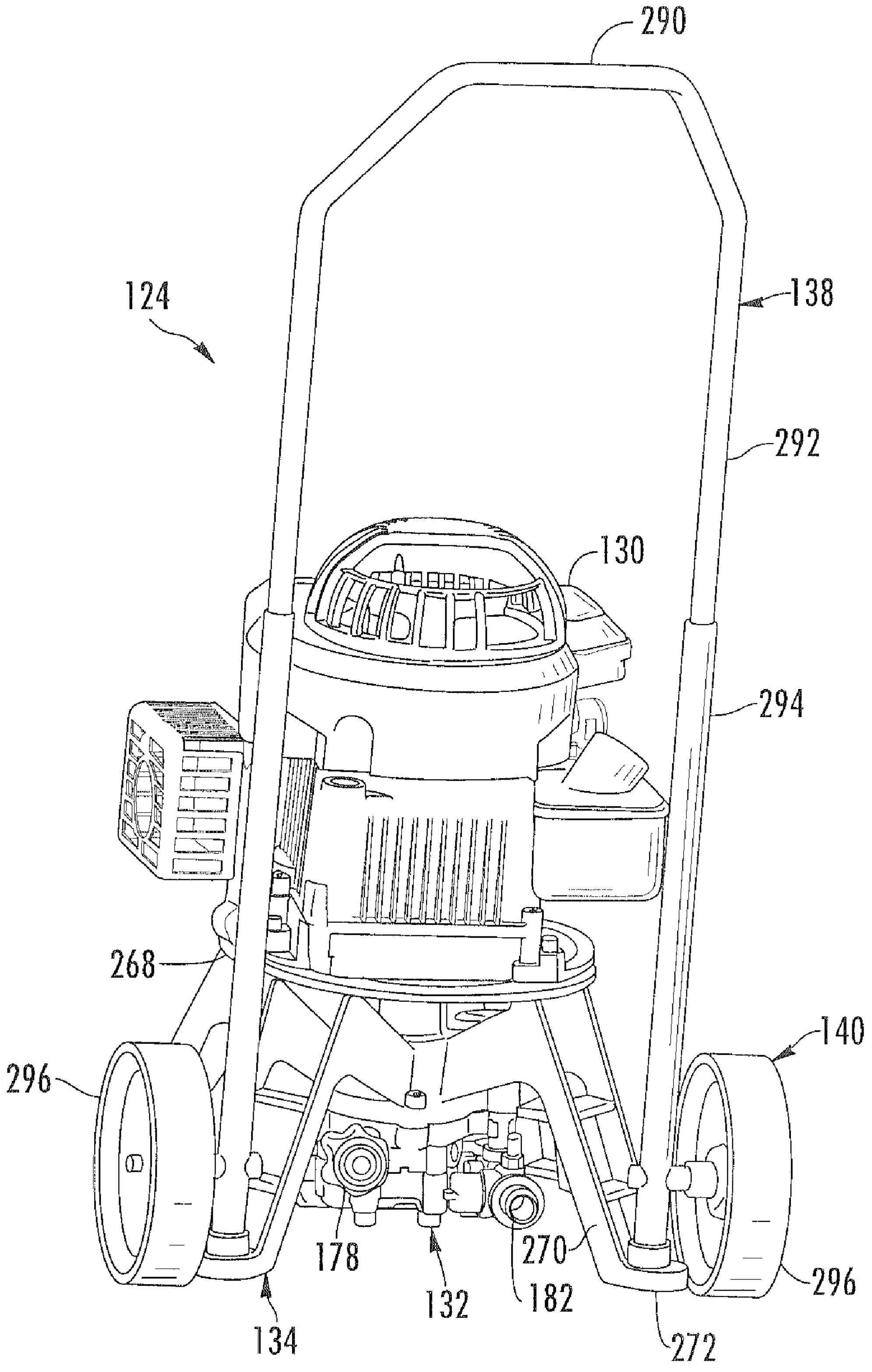
FIG. 3 is a rear perspective view of the pressure washer of FIG. 2.

FIGS. 2 and 3 illustrates pressure washer 124, a particular embodiment of pressure washer 24 shown in FIG. 1. Like pressure washer 24, pressure washer 124 is configured to be used with a liquid source 22 to pressurize the liquid from source 22, wherein the pressurized liquid is expelled using a manual discharge device, such as wand 58 (shown in FIG. 1). Like pressure washer 24, pressure washer 124 is portable (it has a weight and size such that it may be manually moved by one or more individuals) and offers an arrangement of an engine, pump and stand that is compact, sturdy and less complex.

As shown by FIGS. 2 and 3, pressure washer 124 generally includes engine 130, pressure washer pump 132, stand 134, handle 138 and wheel assembly 140. As will be described hereafter, stand 134 is directly connected to pump 132, reducing the complexity, cost and space consumption of pressure washer 124.

Engine 130 comprises a small internal combustion engine such as those commercially available from Briggs & Stratton of Wauwatosa, Wis., such as single cylinder vertical shaft engines: M9, M10, M12 or W14; V-twin vertical shaft engines, M40, M44, M49. In other embodiments, engine 130 may alternatively comprise smaller or larger engines sold or manufactured by Briggs & Stratton or others. Engine 130 is supported above pump 132. Engine 130 supplies motion or power so as to drive pump 132.

Pump 132 receives low pressure liquid from liquid source 22 (shown in FIG. 1) and outputs the same liquid at a much greater pressure. According to one embodiment, pump 132 comprises a pump at least similar to the pump shown and described in U.S. Pat. No. 6,092,998 to Dexter et al. which issued on Jul. 25, 2000, the full disclosure of which is hereby incorporated by reference. In other embodiments, pump 132 may comprise other pumps having other configurations.

Figure 4:
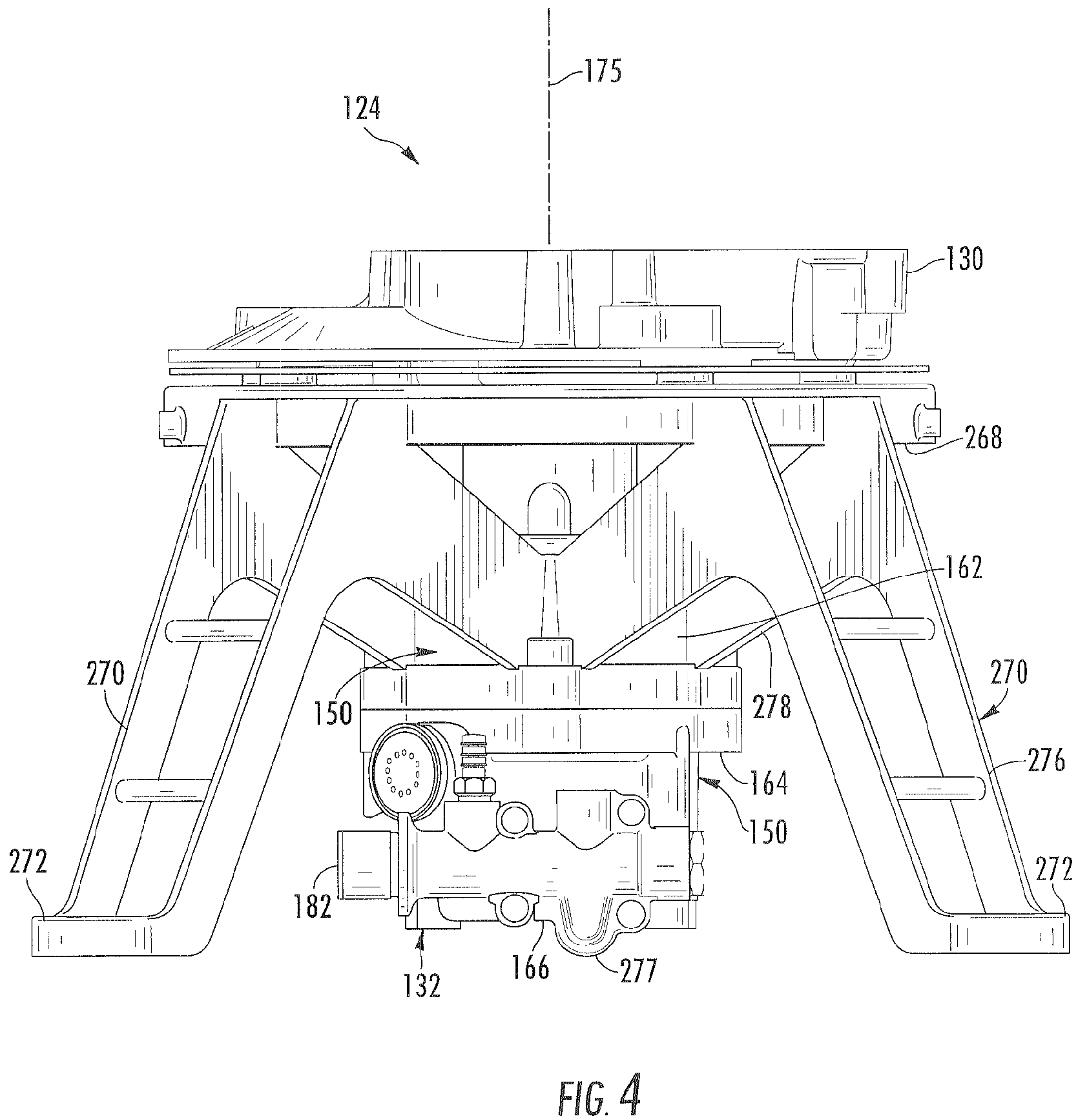
FIG. 4 is a side elevation of view of a stand, a pump and a lower portion of an engine of the pressure washer of FIGS. 2 and 3.
Figure 5:
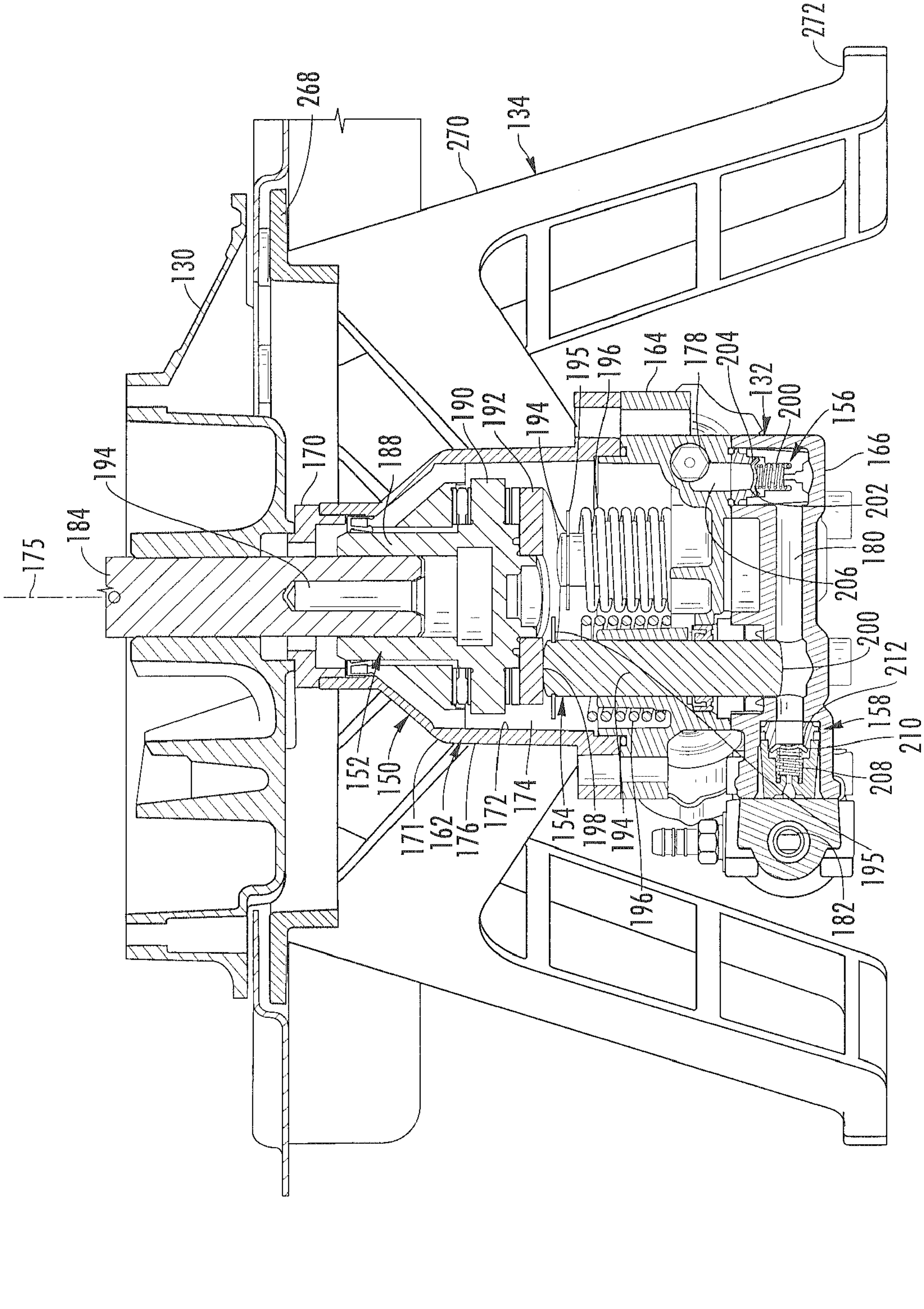
FIG. 5 is a sectional view of the stand, pump and lower portion of the engine of FIG. 4.

As shown by FIGS. 4 and 5, in the example illustrated, pump 132 comprises an outer housing 150, rotary shaft assembly 152, piston assembly 154, low pressure inlet valve assembly 156 and high pressure outlet valve assembly 158. Outer housing 150 encloses internal components of pump 132. In the example illustrated, housing 150 includes cam enclosure 162, journal plate 164 and head 166. Cam enclosure 162 substantially encloses rotary shaft assembly 152. Enclosure 162 has an upper end sealed by an oil shaft seal 170 and a lower and joined to journal plate 164. Cam enclosure 162 has a wall 171 with an inner surface 172 at least partially forming or defining an internal chamber 174 and outer surface 176. Internal chamber 174 receives a lower portion of rotary shaft assembly 152 and a portion of piston assembly 154. Internal chamber 174 further forms a sump or reservoir configured to contain a bath of lubricant about portions of rotary shaft assembly 152 and piston assembly 154. Outer surface 176 extends substantially opposite to inner surface 172 and is directly connected to, contacted by or directly joined to stand 134.

Journal plate 164 extends between cam enclosure 162 and head 166. Journal plate 164 cooperates with cam enclosure 162 to form chamber 174. Journal plate 164 additionally supports or journals moving components of piston assembly 154. Although stand 134 is illustrated as being directly connected to cam enclosure 162 of outer housing 150, in other embodiments, stand 134 may alternatively be directly connected to exterior portions of journal plate 164. In the example illustrated, journal plate 164 defines a low pressure liquid inlet 178 through which liquid from liquid source 22 (shown in FIG. 1) enters pump 132. In other embodiments, inlet 178 may be provided in other portions of housing 150.

Head 166 extends at a lower end of outer housing 150. Head 166 is joined to a lower end of journal plate 164. Head 166 forms a fluid passage 180 between low pressure fluid inlet 178 and a high-pressure fluid outlet 182. Fluid passage 180 receives at least portions of the pressure valves on 156 and high-pressure valve assembly 158. Passage 180 is additionally in communication with portions of piston assembly 154, whereby liquid within passage 180 is pressurized prior to being ejected through opening 182.

Rotary shaft assembly 152 is configured to interface with a drive shaft 184 of engine 130. Rotary shaft assembly 152 is further configured to transmit force or motion from driveshaft 184 to piston assembly 154 to pressurize liquid within passage 180. Rotary shaft assembly 152 includes cam shaft 188, wobble plate 190 and thrust washer 192. Camshaft 188 comprises a member configured to connect to driveshaft 184 of engine 130. In the particular embodiment illustrated, camshaft 188 includes a key or slot 194 which mates with a corresponding slot or key of shaft 184. In other embodiments, camshaft 188 may be configured to be connected to driveshaft 184 in other fashions.

Wobble plate 190, also known as an annular cam, extends from or is joined to camshaft 188 and is received within chamber 174. Wobble plate 190 supports the thrust washer 192. As will be described here after, wobble plate 190 and thrust washer 192 interface with piston assembly 154 to reciprocate pistons 194 of piston assembly 154 upon rotation of driveshaft 184 and camshaft 188. Thrust washer 192 mounts to wobble plate 190 and bears against pistons 194 of piston assembly 154. Thrust washer 192 provides a bearing surface for rotary shaft assembly 152.

In the example illustrated, thrust washer 192 has an uneven or non-level surface such that a plurality of pistons 194 of piston assembly 154 are sequentially driven. In other embodiments, the uneven surface may alternatively be provided by wobble plate 190. In yet other embodiments, thrust washer 192 and wobble plate 198 may be provided by a single structure. Although wobble plate 190 is illustrated as being integrally formed a single unitary body with camshaft 188, in other embodiments camshaft 188 may be a separate element joined to wobble plate 190 such as being threaded to wobble plate 190. In still other embodiments, rotary driveshaft assembly 152 may have other configurations.

Piston assembly 154 receives force from rotary driveshaft to pressurize liquid within passage or channel 180. Piston assembly 154 includes pistons 194 (two of which are shown), piston caps 195 and piston springs 196. In one embodiment, piston assembly 154 includes three sets of pistons 194, caps 195 and piston springs 196. Pistons 194 have an upper end 198 in contact with thrust washer 192. Each upper end 198 supports and is fixed to or integrally formed with a piston cap 195. Each upper end 198 is contained within chamber 174. Each piston 194 has a lower end 200 in communication with passage 180.

Piston springs 196 comprised compression springs captured between journal plate 164 and piston caps 195. Piston springs 196 react against piston caps 195 to urge pistons 194 in an upward direction into abutment with thrust washer 192. As wobble plate 190 and thrust washer 192 are rotated by the rotation of driveshaft 184, each of pistons 194 reciprocate upwardly and downwardly within housing 150 and through journal plate 164. As a result, liquid within passage 180 is pressurized.

Low-pressure valve assembly 156 is contained within passage 180 between low-pressure inlet 178 and high-pressure fluid outlet 182. Low pressure valve assembly 156 provides one-way fluid communication from inlet 178 to fluid passage 180. As a result, low pressure water or other liquid can only flow into passage 180.

In the example illustrated, assembly 156 includes a valve spring 200 that biases a valve poppet 202 against a valve seat 204. During an intake stroke of each piston 194, (upward movement of piston 194 in FIG. 5), the pressure of the liquid contained within the interior cavity 206 in journal plate 164 is greater than the pressure water contained in channel or passage 180. As a result, valve poppet 202 is moved off of valve seat 204 to allow inlet water or liquid to pass through inlet valve assembly 156 into the passage 180. During the power stroke of piston 194 (downward movement of piston 194), wherein valve assembly 86 acts as a check valve and prevents the high-pressure water in the fluid channel 180 from flowing through the inlet valve assembly 156 and into chamber 206.

High-pressure outlet assembly 158 is disposed in the passage 180 proximate to fluid outlet 182. In the example illustrated, high-pressure outlet valve assembly 158 includes a valve spring 208 which biases a valve poppet 210 against a valve seat to 12. During the power stroke of piston 94, water or liquid contained within passage 180 is increased to raise valve poppet 210 off valve seat 212 to allow outlet water or liquid to flow through valve assembly 158 into outlet 182. During the intake stroke of piston 194, outlet valve assembly 158 acts as a check valve and prevents high-pressure water in outlet passage 182 from flowing back through the assembly 158 and into passage or channel 180. In some embodiments, valve assembly 158 may additionally include a relief valve for removing excess pressure. In other embodiments, piston assembly 154 may have other configurations and may operate in other fashions.

Figure 6:
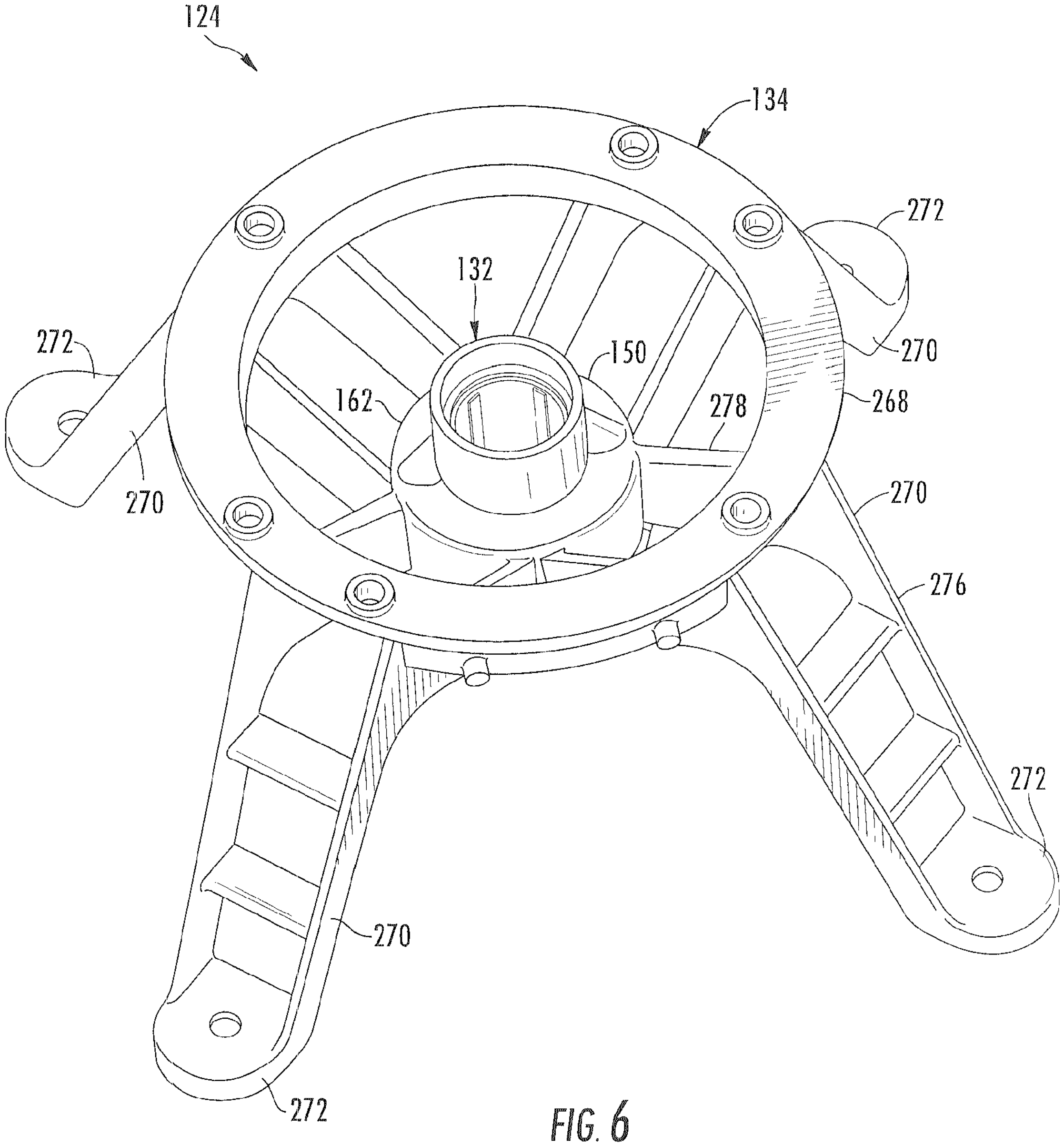
FIG. 6 is a top perspective view of the stand and a portion of a housing of the pump of FIG. 4.
Figure 7:
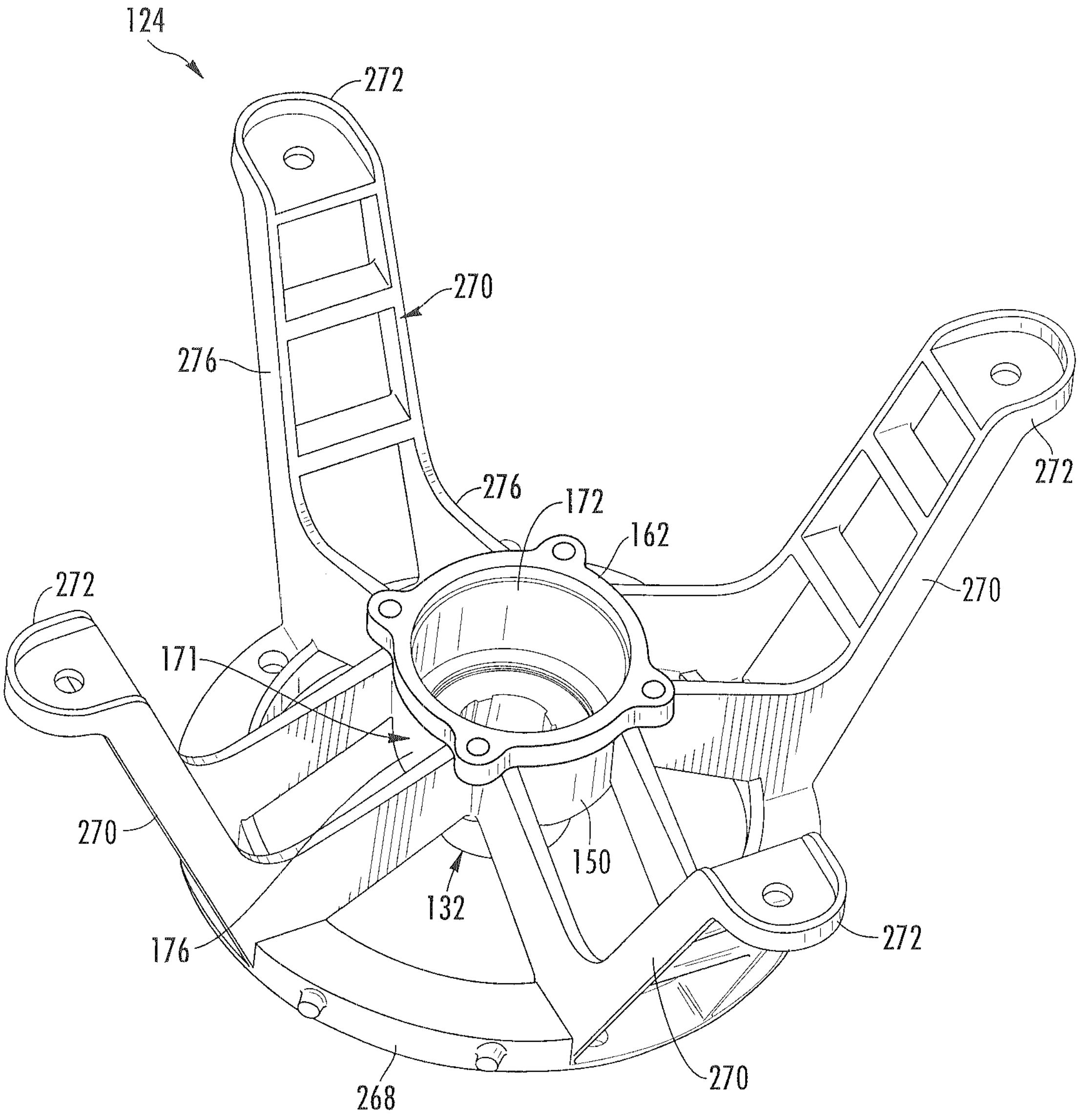
FIG. 7 is a bottom perspective view of the stand and the portion of the housing of the pump of FIG. 4.

Stand 134 supports engine 130 and pump 132. In one embodiment, stand 134 elevates engine 130 and pump 132 above a support surface, such as a floor or ground. FIGS. 6 and 7 illustrate stand 134 and portions of housing 150 separate from a remainder of pump 132. Stand 134 includes base 268, legs 270 and feet 272.

Base 268 comprises a platform or other structure configured to be joined or connected to underside of engine 130. Based 268 further interconnects each of legs 270. As a result, base 268 and legs 270 provide a single unitary structure to which engine 130 is connected. In the example illustrated, base 268 comprises an annular member or ring encircling housing 150. In other embodiments, base 268 may have other configurations. In yet other embodiments, base 268 may be omitted. In embodiments where base 268 is omitted, legs 270 may be connected independent of one another to cam enclosure 162 of housing 150 or other portions of housing 150.

Legs 270 extend from housing 250 of pump 132 and terminate at feet 272. Legs 270 are directly connected to housing 150 of pump 132. In the example illustrated, legs 270 are directly connected to outer surface 176 of wall 171 of cam enclosure 162. In the example illustrated, each leg 270 has a vertical portion 276 extending between the feet 272 and base 268 and a strut portion 278 extending from vertical portion 276 into direct contact and connection with housing 150. In such an embodiment, housing 150 serves as a hub, wherein strut portions 278 serve as spokes forming a rigid unified structure. In yet other embodiments, strut portions 278 may alternatively extend between base 268 and housing 150 independent of legs 270, which would omit strut portions 278. Because legs 270 are located at equi-angularly spaced locations about housing 150, stabilization of pump 132 and pressure washer 124 is enhanced.

In the example illustrated, strut portions 278 are directly connected to cam enclosure 162 of housing 150 at locations substantially horizontally opposite to wobble plate 190, thrust washer 192 and the upper ends 198 of pistons 194. As a result, strut portions 278 are connected to housing 150 proximate a vertical center portion of pump 132 and proximate to portions of pump 132 where larger forces are transmitted. As a result, stand 134 may better stabilize pump 132 and a better absorb and suppress vibration.

Because housing 150 of pump 132 is connected directly to stand 134, stand 134 better stabilizes pump against vibration. Because housing 150 of pump 312 is connected directly to stand 134, housing 150 of pump 132 supplements the rigidity of stand 134. As a result, the combination of housing 150 and stand 134 forms a more rigid and sturdy structure for supporting pump 132 and engine 130. In addition, because housing 150 of pump 130 forms a part of the overall structure supporting pressure washer 124, pressure washer 124 may be formed with fewer parts, is less complex and is more compact.

In the particular example illustrated, legs 270 are directly connected to housing 150 of pump 132 at multiple spaced locations about pump 132. Legs 270 are equi-angularly spaced about pump 132. Housing 150 of pump 132 extends along and is centered about a vertical axis 175, wherein legs 270 include at least three legs, and nominally four legs, angularly spaced from one another about axis 175. In the embodiment illustrated, legs 270 concentrically extend about pump housing 150. Housing 150 has a lower end 277 between locations where each of legs 270 is connected to housing 150 and feet 272. As a result, pump 132 and its housing 150 are at least partially nested within and between legs 270. Consequently, the height of pressure washer 124 is reduced, providing pressure washer 124 with a lower center of mass. The length of legs 270 may also be reduced. Thus, pressure washer 124 is more compact and more stable.

As shown by FIGS. 6 and 7, stand 134 and its legs 270 are directly joined to outer surface 176 of pump housing 150 by being integrally formed as part of a single unitary body with surface 176 of housing 150. As a result, the overall supporting structure provided by pump housing 150 and stand 134 is stronger and more rigid. Moreover, legs 270 and housing 150 are formed as a single unit, reducing cost and complexity. In one embodiment, pump housing 150 and legs 270 are integrally formed as a single unitary body from a cast, or molded metal, such as aluminum. In another embodiment, legs 270 are integrally formed as part of a single unitary body with wall 171 or surface 176 of housing 150 by being welded to wall 171.

In yet other embodiments, stand 134 and its legs 270 are directly joined to outer wall 171 of pump housing 150 by being mounted directly to housing 150 or wall 171 of housing 150. For example, in one embodiment, legs 270 may be riveted or otherwise fastened to housing 150 in a substantially permanent manner, wherein removal or separation of stand 134 from pump housing 150 would require breaking, cutting or severing of those elements securing stand 134 to pump housing 150.

In still other embodiments, legs 270 may be directly connected to housing 150 of pump 132 in a removable fashion. For example, in one embodiment, legs 270 may be directly connected to pump housing 150 with screws, bolts or other fasteners which require the use of tools, but which allow legs 270 to be separated from pump housing 150 without permanent deformation or destruction of the fastening elements. In still other embodiments, legs 270 are directly connected to pump housing 50 with one or more releasable or removable fastening structures that allow legs 170 to be manually separated from pump housing 150 without the use of tools. For example, in one embodiment, each of legs 270 or multiples of legs 270 interconnected as a group or subgroup of the total number of legs 270 may be secured to pump housing 150 using tongue and groove arrangements, snap lock arrangements and the like. In one embodiment, housing 150 may be provided with the groove that is configured receive a tongue associated with one or more of legs 270. In those embodiments in which legs 270 are removable or separable from housing 150 without deforming or destroying parts of the connection, legs 270 may be removed for storage or shipment. Legs 270 may also be removed for replacement or repair.

Feet 272 extend from a lower end of each of legs 270 and are configured to bear against or rest upon the supporting surface. Feet 272 provide a stable structure for supporting pressure washer 124. In one embodiment, feet 272 may be provided with shoes 273 (showing FIG. 8) which provide increased gripping or friction. In other embodiments, feet 272, themselves, may have surfaces configured to grip a supporting surface. In the particular embodiment illustrated, two of feet 272 provide structures upon which wheel assemblies are mounted. In yet other embodiments, feet 272 may be omitted.

As shown by FIGS. 2 and 3, handle 138 comprises a structure coupled to the remainder of pressure washer 124 configured to facilitate repositioning and transport of pressure washer 124. Handle 138 includes a manual gripping portion 290 by which a person may manually grasp handle 238. Gripping portion 290 extends above engine 130. As a result, a person may individually move pressure washer 124 by grasping grouping portion 290 without having to bend over as much. In particular embodiments, handle 138 is configured to be actuated between different configurations or lengths such that gripping portion 290 may be set at different heights with respect to engine 124. As a result, gripping portion 290 may be set at different heights to accommodate different heights of different individuals or gripping portion 290 may be repositioned below a top of engine 130 to facilitate compact storage or shipment.

In the particular embodiment illustrated, handle 138 is telescopic, wherein an upper portion 292 of handle 138 telescopically extends and retracts with respect to a lower portion 294 of handle 138. In the example illustrated, lower portion 294 of handle 138 is bolted or otherwise fastened to feet 272 of two of legs 270. As a result, feet 272 and legs 270 provide a secure, stable and convenient surface to which handle 138 may be secured. In other embodiments, handle 138 may be secured to other portions of stand 134. In some other embodiments, handle 138 may alternatively be mounted to portions of the housing of engine 130. In other embodiments, handle 138 may include multiple segments configured to be pivoted or folded relative to one another. In yet other embodiments, handle 318 may have a single non-adjustable height or length.

Wheel assembly 140 comprises one or more wheels 296 rotationally coupled to pressure washer 124 to facilitate rolling movement of pressure washer 124. In the example illustrated, wheel assembly 140 included two wheels 296 rotationally coupled to a lower end of lower portion 294 of handle 138 so as to elevate rear legs 270 (those legs 270 closest to wheels 296) above the supporting surface or ground. Wheels 296 enable handle 138 to be tilted back to lift front legs 270 of stand 134, allowing pressure washer 124 to be rolled when being moved. In other embodiments, wheel assembly 140 may be mounted to other structures, such as other portions of stand 134. In some embodiments, wheel assembly 140 may be omitted.

Figure 8:
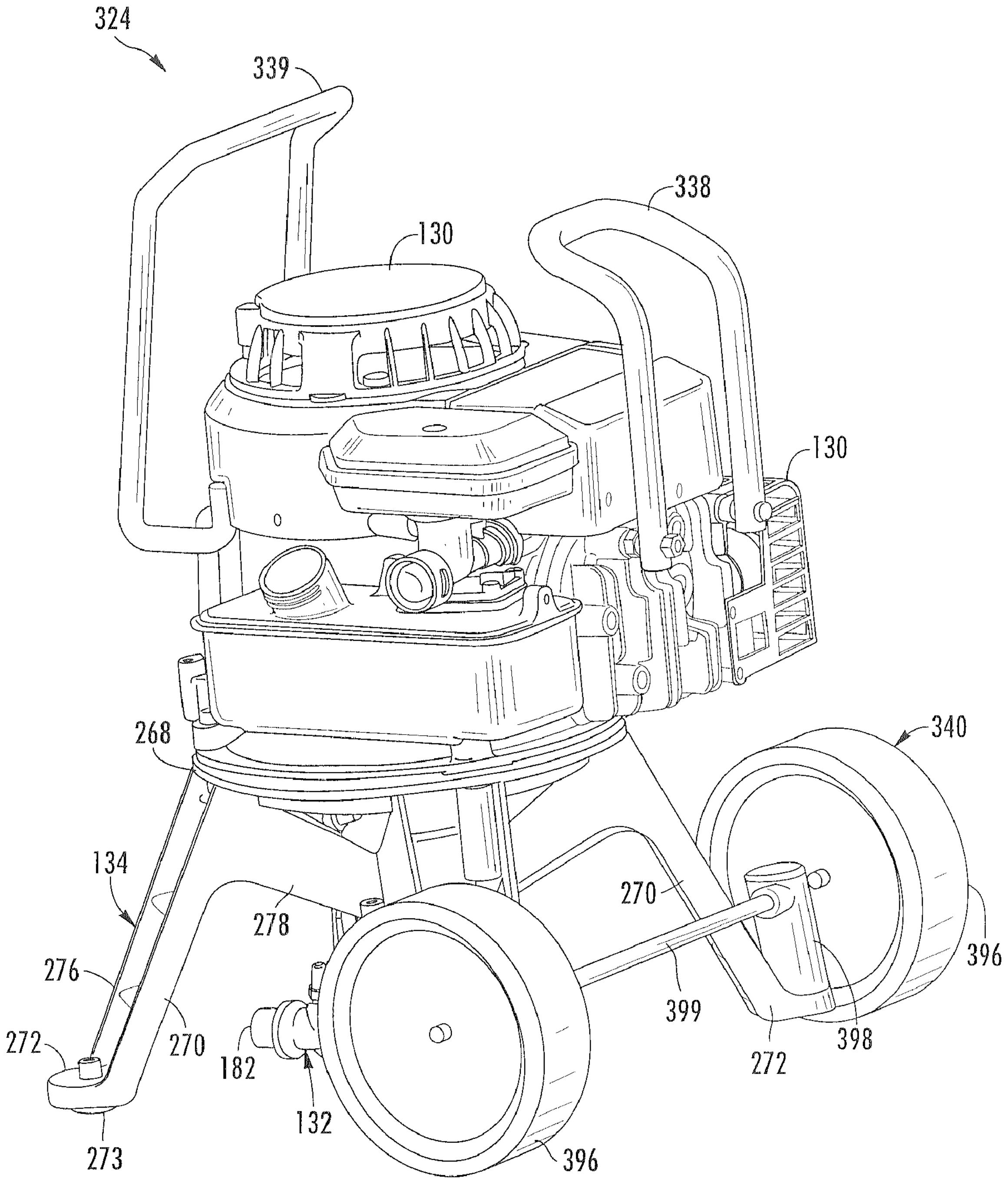
FIG. 8 is a rear perspective view of another embodiment of the pressure washer of FIG. 1 according to an example embodiment.

FIG. 8 illustrates pressure washer 324, another embodiment of pressure washer 24. Pressure washer 324 is similar to pressure washer 124 except that pressure washer 324 includes handles 338 and 339 in place of handle 138 and includes wheel assembly 340 in place of wheel assembly 140. Those remaining elements of washer 324 which correspond to elements of washer 124 are numbered similarly. As shown by FIG. 8, in lieu of being mounted or connected directly to feet 272 of stand 134, handle 338 and 339 are mounted directly to a housing or chassis of engine 130. Handles 338 and 339 are located on a rear end and a front-end of pressure washer 324. As a result, pressure washer 324 may be more easily transported or moved from either end.

Wheel assembly 340 is similar to wheel assembly 140 except that wheel assembly 340 has wheels 396 rotationally coupled to columns, pillars or posts 398 mounted to feet 272. In the example illustrated, posts 398 are bolted to feet 272 through apertures in feet 272. Posts 398 extend from two rear feet 272 and are rotationally journal axle 399 to which both the wheels 396 are attached. Axle 399 stabilizes the connection of wheel 396 to the remainder of pressure washer 324. In other embodiments, wheels 396 may be rotationally coupled to legs 270 or other portions of stand 134 in other fashions.

Overall, pressure washers 24, 124 and 324 have arrangements of an engine, a pump and a stand which is less complex, less costly and less space consuming. Because housing 50, 150 of pump 32, 132 is connected directly to stand 34:34, pump 32:32 is better stabilized against vibration. Because housing 50, 150 of pump 32, 132 is connected directly to stand 34, 134, housing 50, 150 of pump 32, 132 supplements the rigidity of stand 34, 134. As a result, the combination of housing 50, 150 and stand 34, 134 forms a more rigid and sturdy structure for supporting pump 32, 132 and engine 30, 130. In addition, because housing 50, 150 of pump 32, 132 forms a part of the overall structure supporting pressure washer 24, 124, pressure washer 24, 124 may be formed with fewer parts, is less complex and is more compact.

What is claimed is:

1. An apparatus comprising:
an engine;
a pressure washer pump coupled to and driven by the engine, the pump having a housing; and
a stand directly connected to the pump housing, the stand comprising:
a horizontal platform connected to an underside of the engine; and
legs comprising:
vertical portions directly connected to and obliquely extending from the platform; and
strut portions obliquely extending from the housing to the vertical portions on an underside of the platform, wherein the housing includes an outer wall, the outer wall having an inner surface forming an internal chamber configured to contain a pressure washer wobble plate in a bath of lubricant and an outer surface opposite the inner surface and from which one of the struts portions extends.

2. The apparatus of claim 1 further comprising a handle coupled to the stand.

3. The apparatus of claim 2, wherein the handle is removably coupled to the stand.

4. The apparatus of claim 2, wherein the handle is above the engine.

5. The apparatus of claim 1, wherein the engine is directly over the pump.

6. The apparatus of claim 1, wherein the stand concentrically extends about the housing.

7. The apparatus of claim 1, wherein
the legs terminate at feet.

8. The apparatus of claim 7, wherein the housing has an upper end substantially at or below the horizontal platform and a lower end between the horizontal platform and the feet.

9. The apparatus of claim 7, wherein the legs and the horizontal platform are integrally formed as a single unitary body.

10. The apparatus of claim 9, wherein the legs are integrally formed as a single unitary body with the outer wall of the housing.

11. The apparatus of claim 1, wherein the stand is removably connected to the housing.

12. The apparatus of claim 1, wherein the stand is integrally formed as a single unitary body with the housing.

13. The apparatus of claim 1, wherein the stand includes at least three legs, each leg being independently removable from the housing.

14. The apparatus of claim 1, wherein the legs are integrally formed as a single unitary body with the outer wall of the housing.

15. The apparatus of claim 1, wherein the pump housing extends along and is centered about a vertical axis and wherein the stand includes at least three legs angularly spaced from one another about the axis.

16. An apparatus comprising:
a pressure washer pump housing having an outer wall, the outer wall having an inner surface forming an internal chamber configured to contain a pressure washer wobble plate in a bath of lubricant and an outer surface opposite the inner surface; and
a stand directly connected to the outer surface of the outer wall of the pump housing, the stand comprising:
a horizontal platform connected to an underside of an engine; and
legs comprising:
vertical portions directly connected to and obliquely extending from the platform; and
strut portions obliquely extending from the housing to the legs on an underside of the platform, wherein the portions extend from the outer surface of the outer wall of the pressure washer pump housing.

17. A method comprising:
supporting an engine with a stand; and
supporting a pressure washer pump with the stand, wherein the stand is directly connected to a housing of the pressure washer pump, the stand comprising:
a horizontal platform connected to an underside of the engine; and
legs comprising:
vertical portions directly connected to and obliquely extending from the platform; and strut portions obliquely extending from the housing to the vertical portions on an underside of the platform, wherein the housing includes an outer wall, the outer wall having an inner surface forming an internal chamber configured to contain a pressure washer wobble plate in a bath of lubricant and an outer surface opposite the inner surface and from which one of the portions extends.

18. The apparatus of claim 1, wherein the strut portions each comprise one or more plates in a vertical orientation.

19. The apparatus of claim 1, wherein the outer wall and said one of the strut portions are integrally formed as a single unitary body.

20. The apparatus of claim 1 further comprising:

feet extending outwardly from the legs;

posts extending from the feet; and wheels rotatably supported by the feet.

21. An apparatus comprising:

an engine;

a pressure washer pump coupled to and driven by the engine, the pump having a housing; and a stand directly connected to the pump housing, the stand comprising:

a horizontal platform connected to an underside of the engine; and legs comprising:

vertical portions directly connected to and obliquely extending from the platform; and strut portions obliquely extending from the housing to the vertical portions on an underside of the platform, wherein the housing includes an outer wall, the outer wall having an inner surface forming a liquid chamber through which liquid being pumped flows and an outer surface to which the stand is directly connected, wherein the legs are integrally formed as a single unitary body with the outer wall of the housing.

22. An apparatus comprising:

an engine;

a pressure washer pump coupled to and driven by the engine, the pump having a housing; and a stand directly connected to the pump housing, the stand comprising:

a horizontal platform connected to an underside of the engine; and legs integrally formed as a single unitary body with the horizontal platform and comprising:

vertical portions directly connected to and obliquely extending from the platform, the vertical portions terminating at feet; and strut portions obliquely extending from the housing to the vertical portions of the legs on an underside of the platform, wherein the housing includes an outer wall, the outer wall having an inner surface forming an internal chamber configured to contain a pressure washer wobble plate in a bath of lubricant and an outer surface to which the stand is directly connected and wherein the strut portions are integrally formed as a single unitary body with the outer wall of the housing.

* * * * *